US012741494B2

(12) United States Patent
Toda et al.

(10) Patent No.: US 12,741,494 B2
(45) Date of Patent: Sep. 22, 2026

(54) WHEEL MODULE

(71) Applicants: TODA RACING Co., Ltd., Kurashiki (JP); DENSO CORPORATION, Kariya-city (JP)

(72) Inventors: Yukio Toda, Kurashiki (JP); Yuta Suzuki, Kariya-city (JP)

(73) Assignees: DENSO CORPORATION, Kariya-city (JP); TODA RACING Co., Ltd., Kurashiki (JP)

(*) Notice: Subject to any disclaimer, the term of this patent is extended or adjusted under 35 U.S.C. 154(b) by 425 days.

(21) Appl. No.: 18/476,040

(22) Filed: Sep. 27, 2023

(65) Prior Publication Data

US 2024/0017579 A1 Jan. 18, 2024

Related U.S. Application Data

(63) Continuation of application No. PCT/JP2022/011715, filed on Mar. 15, 2022.

(30) Foreign Application Priority Data

Mar. 29, 2021 (JP) ................................ 2021-055592

(51) Int. Cl.
*B60G 3/14* (2006.01)
*B60G 15/02* (2006.01)
(Continued)

(52) U.S. Cl.
CPC ............ *B60G 3/145* (2013.01); *B60G 15/02* (2013.01); *B62D 5/046* (2013.01); *B62D 7/14* (2013.01);
(Continued)

(58) Field of Classification Search
CPC .. B60G 3/145; B60G 15/02; B60G 2200/132; B60G 2202/12; B60G 2202/312;
(Continued)

(56) References Cited

U.S. PATENT DOCUMENTS 1,302,489 A * 4/1919 Hollis .................. B60B 35/109 301/124.1
4,241,803 A * 12/1980 Lauber ...................... B60P 3/40 280/765.1
(Continued)

FOREIGN PATENT DOCUMENTS

JP 2003-261295 A 9/2003
JP 2005-132174 A 5/2005
(Continued)

*Primary Examiner* — Timothy Wilhelm
(74) *Attorney, Agent, or Firm* — Precision Patents, P.C.

(57) ABSTRACT

A wheel module for a vehicle includes a tire, a steering unit, a driving unit, a braking unit, and a suspension mechanism. The steering unit is configured to output a steering force for the tire. The driving unit is configured to output a driving force for the tire. The braking unit is configured to output a braking force for the tire. The suspension mechanism is supported by an upper end fulcrum and a lower end fulcrum so as to reduce vibration or impact transmitted from a road surface. An imaginary straight line extending along a vertical direction and passing through a center of the tire in a radial direction and in a width direction of the tire is defined as a tire central axis. The lower end fulcrum of the suspension mechanism is positioned away from the tire central axis when viewed from a side surface of the tire.

10 Claims, 9 Drawing Sheets

(51) Int. Cl.
*B62D 5/04* (2006.01)
*B62D 7/14* (2006.01)

(52) U.S. Cl.
CPC .... *B60G 2200/132* (2013.01); *B60G 2202/12* (2013.01); *B60G 2202/312* (2013.01)

(58) Field of Classification Search
CPC ............ B60G 2200/44; B60G 2204/30; B60G 2206/0114; B60G 2300/37; B60G 3/20; B60G 2300/50; B60G 3/02; B62D 5/046; B62D 7/14; B62D 5/0418; B62D 7/023; B60K 7/0007; B60K 2007/0038; B60K 2007/0092
See application file for complete search history.

(56) References Cited

U.S. PATENT DOCUMENTS 5,782,484 A * 7/1998 Kuhn, Jr. ............... B60G 3/265 267/248
6,336,514 B1 * 1/2002 Ramacher ................ B62D 7/02 180/443
6,681,905 B2 * 1/2004 Edmondson ........... B60G 13/02 188/290
9,266,557 B2 * 2/2016 Matayoshi ............... B60G 3/20
9,821,835 B2 * 11/2017 Ferrer-Dalmau Nieto ................. B62D 5/26
10,245,914 B2 * 4/2019 Kerner ................ A01M 7/0082
10,293,847 B2 * 5/2019 Calmettes ............ B62D 5/0418
11,104,197 B2 * 8/2021 Stapelbroek Trennepohl ............. B60G 3/01
11,267,283 B2 * 3/2022 Hsu ....................... B60B 19/006
11,472,249 B2 * 10/2022 Kuribayashi ........ B60G 15/063
11,498,379 B2 * 11/2022 Wuebbolt-Gorbatenko ................ B62D 7/18
11,535,075 B2 * 12/2022 Park ......................... B60G 3/20
11,577,783 B2 * 2/2023 Lee .......................... B62D 7/16
11,584,427 B2 * 2/2023 Kuribayashi ............ B62D 7/18
12,059,939 B2 * 8/2024 Lee .......................... B60G 3/26
12,344,066 B2 * 7/2025 Choi ........................ B60G 3/20
12,491,928 B2 * 12/2025 Chang .................... B62D 5/001
12,497,103 B2 * 12/2025 Chang .................. B62D 5/0418
2012/0185136 A1 7/2012 Ohnuma et al.
2014/0083785 A1 3/2014 Dantzie
2015/0054244 A1 * 2/2015 Seo ........................ B62D 17/00 280/86.752
2015/0083508 A1 * 3/2015 Bluethmann ........ B62D 5/0418 180/204
2018/0272826 A1 * 9/2018 Moen ...................... B60B 19/14
2020/0207405 A1 * 7/2020 Kuribayashi ............ B60G 3/18
2020/0223478 A1 * 7/2020 Sano .................... B60G 15/062
2022/0041212 A1 * 2/2022 Moon ...................... B60G 3/06
2022/0055690 A1 * 2/2022 Itoh ...................... B62D 5/0418
2022/0144030 A1 * 5/2022 Ameye .................. B60G 3/202
2022/0153348 A1 * 5/2022 Lee ........................ B60G 7/008
2022/0185096 A1 * 6/2022 Ameye .................... B62D 7/06
2023/0143749 A1 * 5/2023 Lee ........................ B60G 7/008 280/5.521
2023/0234415 A1 * 7/2023 Seong .................. B60G 15/068
2023/0234438 A1 * 7/2023 Lee .......................... B60G 3/20 180/6.48
2023/0302860 A1 * 9/2023 Jeon ......................... B60G 3/20

FOREIGN PATENT DOCUMENTS

JP 2012-106524 A 6/2012
JP 2014210558 A * 11/2014 ............... B62D 7/14
JP 2019-182336 A 10/2019

* cited by examiner

WHEEL MODULE

CROSS REFERENCE TO RELATED APPLICATIONS

The present application is a continuation application of International Patent Application No. PCT/JP2022/011715 filed on Mar. 15, 2022, which designated the U.S. and claims the benefit of priority from Japanese Patent Application No. 2021-055592 filed on Mar. 29, 2021. The entire disclosures of all of the above applications are incorporated herein by reference.

TECHNICAL FIELD

The present disclosure relates to a wheel module.

BACKGROUND

For a vehicle including independently steered wheels capable of being steered independently, there is a technique related to improvement in a shock absorber that absorbs vibration or impact transmitted from a tire to a vehicle body.

SUMMARY

A wheel module includes a tire, a steering unit, a driving unit, a braking unit, and a suspension mechanism for a vehicle including at least two independently steered wheels to be steered independently.

The tire has a side wall defined as a side surface and a tread face defined as a front surface facing frontward of the vehicle. The steering unit is configured to output a steering force for the tire. The driving unit is configured to output a driving force for the tire. The braking unit is configured to output a braking force for the tire. The suspension mechanism is supported by an upper end fulcrum and a lower end fulcrum so as to reduce vibration or impact transmitted from a road surface.

An imaginary straight line extending along a vertical direction and passing through a center of the tire in a radial direction and in a width direction of the tire is defined as a tire central axis. The lower end fulcrum of the suspension mechanism is positioned away from the tire central axis when viewed from a side surface of the tire.

DETAILED DESCRIPTION

Figure 1:
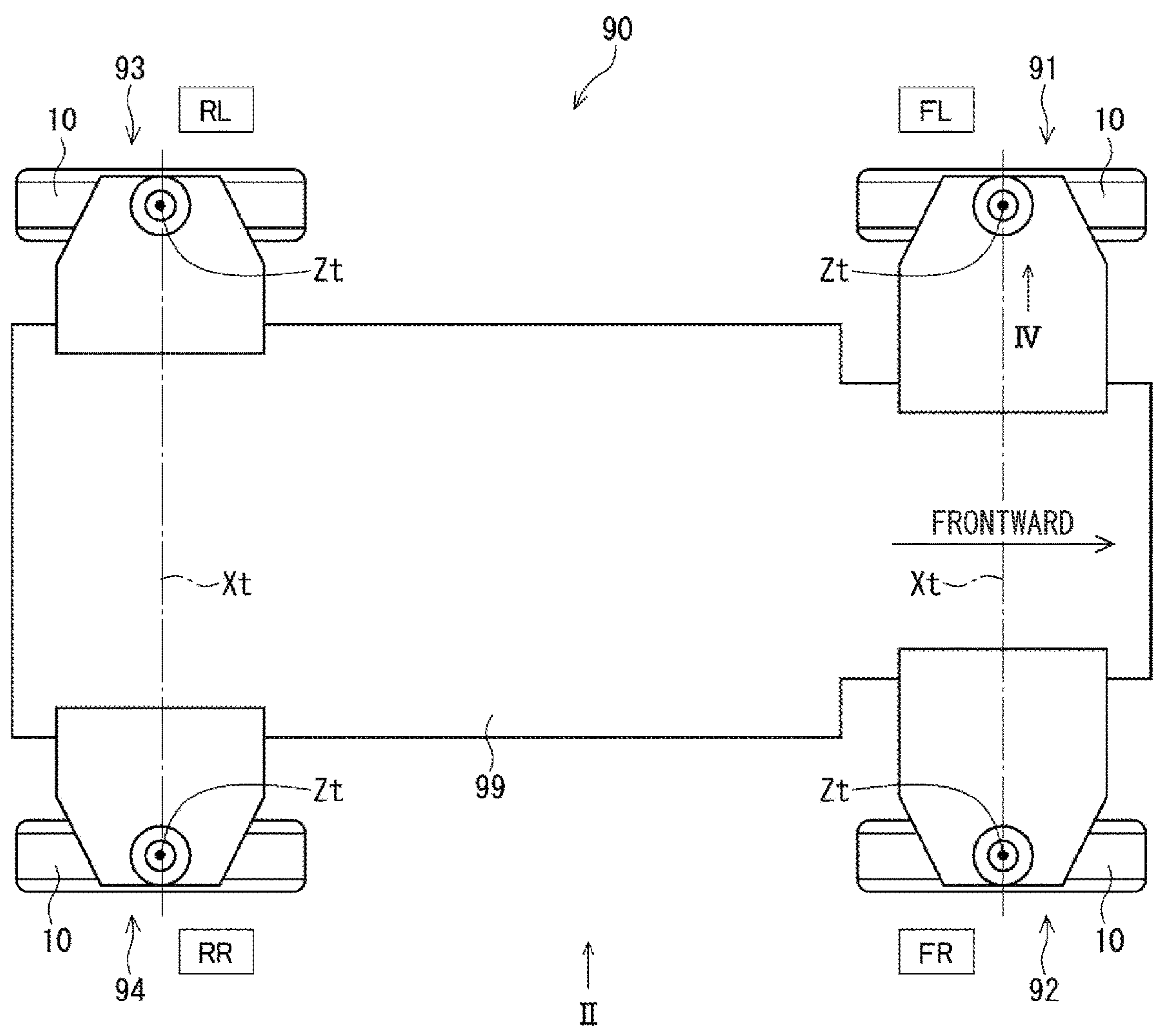
FIG. 1 is a plan view illustrating an independently steered vehicle including a wheel module according to an embodiment.

For a vehicle including independently steered wheels capable of being steered independently, there is known a technique related to improvement of a shock absorber that absorbs vibration or impact transmitted from a tire to a vehicle body. For example, a steering device for a vehicle having an in-wheel motor is required to transmit a sufficiently large rotational torque, even when a damper is added, without increase in the size.

In the steering device, it is understood that an outer shaft housing the shock absorber is arranged along a central axis of the in-wheel motor unit. That is, when the wheel side is viewed as front, the spring of the shock absorber is vertically disposed along the central axis of the tire in the vertical direction. Therefore, the impact from the road surface is directly transmitted to the spring, and the comfortableness of an occupant in the vehicle is deteriorated.

The present disclosure provides a wheel module that improves comfortableness in a vehicle equipped with the wheel module for independently steered wheels.

A wheel module includes a tire, a steering unit, a braking unit, and a suspension mechanism for a vehicle including at least two independently steered wheels to be steered independently.

The tire has a side wall defined as a side surface and a tread face defined as a front surface facing frontward of the vehicle. The steering unit is configured to output a steering force for the tire. The driving unit is configured to output a driving force for the tire. The braking unit is configured to output a braking force for the tire. The suspension mechanism is supported by an upper end fulcrum and a lower end fulcrum so as to reduce vibration or impact transmitted from a road surface.

An imaginary straight line extending along a vertical direction and passing through a center of the tire in a radial direction and in a width direction of the tire is defined as a tire central axis. The lower end fulcrum of the suspension mechanism is positioned away from the tire central axis when viewed from a side surface of the tire.

This makes it difficult for the impact from the road surface to be directly transmitted to the spring. Therefore, it is possible to suppress occurrence of unpleasant vibration when receiving disturbance in the vertical direction due to a step on the road surface, a stone, or the like, and to improve comfortableness.

When viewed from a side surface of the tire, the suspension mechanism may be inclined with respect to the tire central axis.

A wheel module according to an embodiment will be described with reference to the drawings. The wheel module of the present disclosure is used in a vehicle including at least two independently steered wheels that can be steered independently. The independently steered wheel includes the wheel module. In the embodiment, four wheel modules are used in a four-wheel vehicle in which all wheels are independently steered wheels. In the embodiment, steering, braking and driving commands will be described assuming manual driving by a human driver.

FIG. 1 schematically illustrates a plan view of a four-wheel independently steered vehicle 90 viewed from the upper side. The vehicle 90 has a vehicle body 99 and four wheels 91, 92, 93, and 94, e.g., a left front wheel 91, a right front wheel 92, a left rear wheel 93, and a right rear wheel 94. The wheels 91 to 94 are independently steered wheels capable of being steered independently, and each of the wheels has a wheel module 10. The center point of each wheel module 10 represents the tire central axis Zt. The detailed definition of the tire central axis Zt will be described later.

Figure 2:
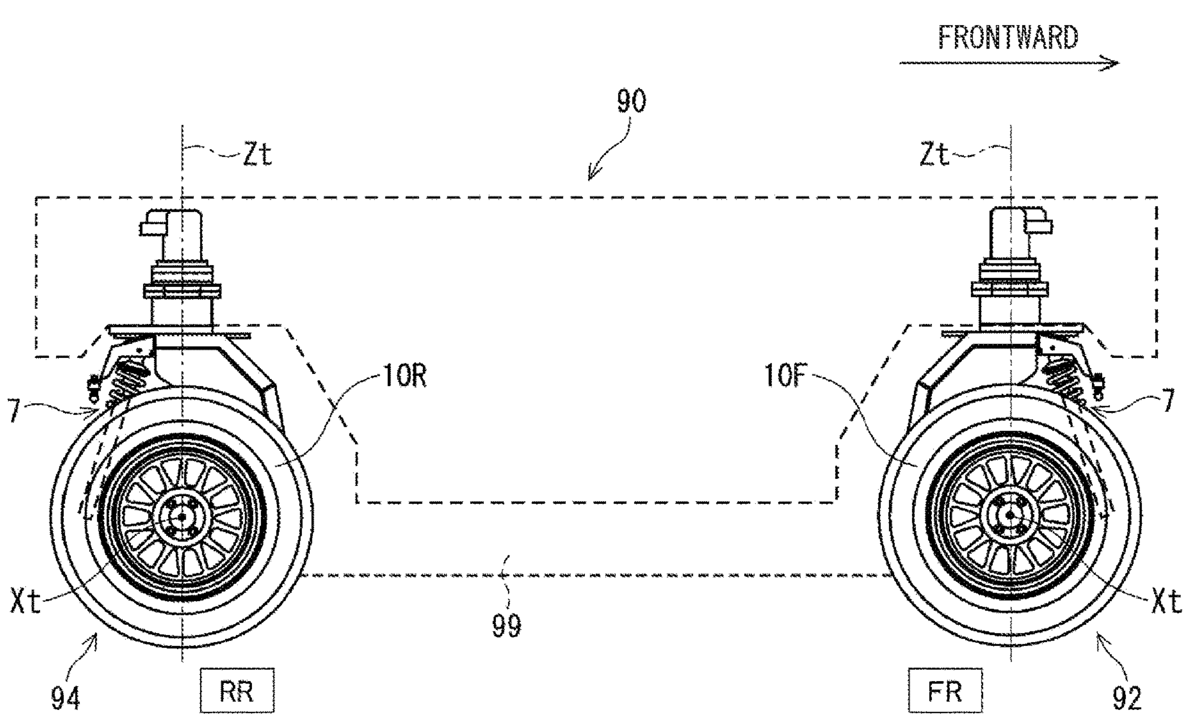
FIG. 2 is a side view of the independently steered vehicle of FIG. 1.
Figure 3:
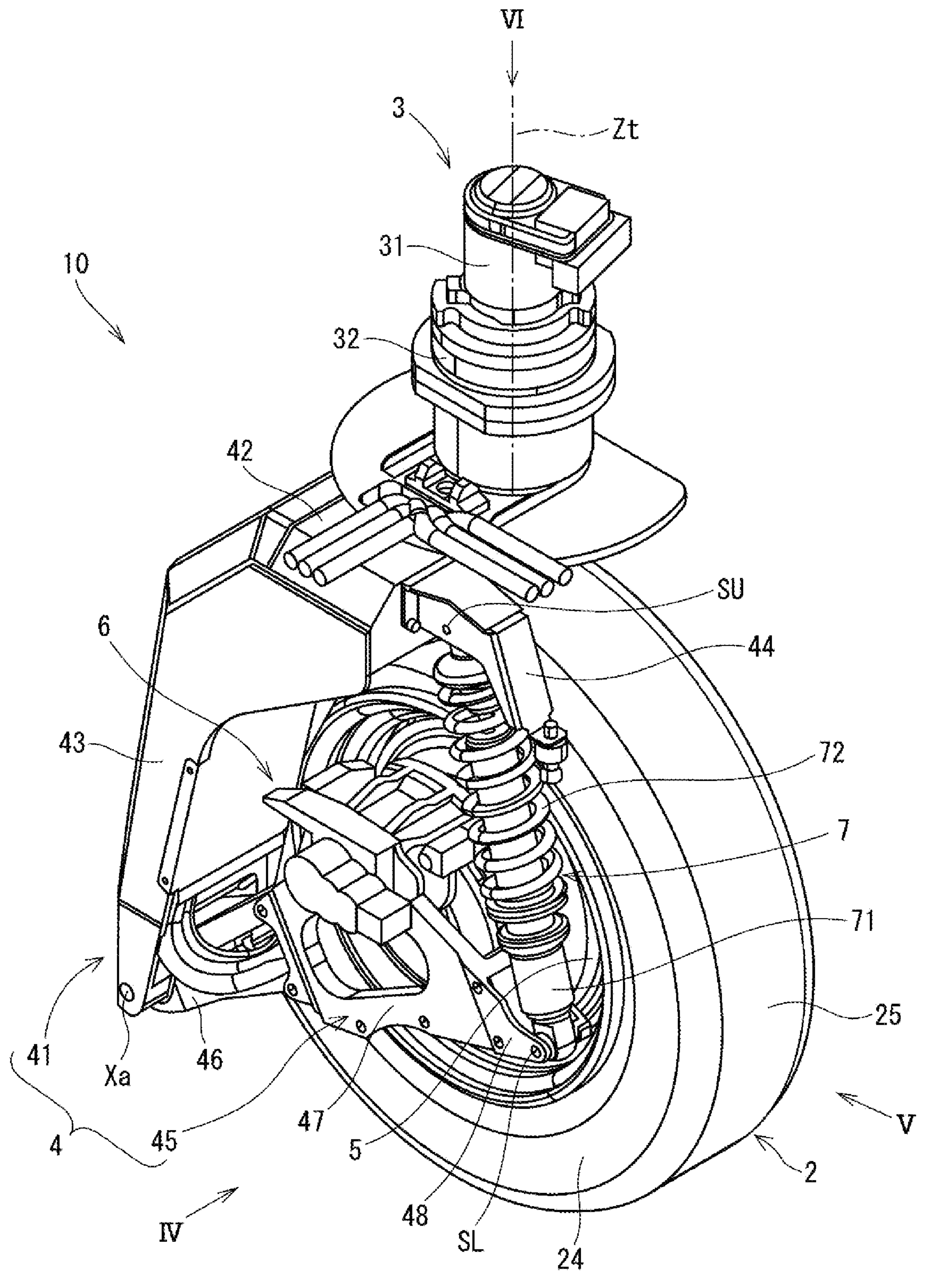
FIG. 3 is a perspective view illustrating the wheel module of the embodiment.

FIG. 2 schematically illustrates the front wheel 92 and the rear wheel 94 viewed from the right side of the vehicle 90. In FIG. 2, the wheel module for the front wheel 92 is denoted by 10F, and the wheel module for the rear wheel 94 is denoted by 10R. The wheel modules 10F, 10R constitute independently steered wheels in the front wheels 91, 92 and the rear wheels 93, 94 of the vehicle 90, also for the left wheels.

Although the detailed configuration of the wheel module 10F, 10R will be described later, the wheel module 10F for the front wheel 92 and the wheel module 10R for the rear wheel 94 are symmetrical in shape in the front-rear direction with respect to the tire central axis Zt in terms of appearance. That is, in the wheel module 10F for the front wheel 92, the suspension mechanism 7 is located on the front side of the vehicle 90 with respect to the tire central axis Zt. In the wheel module 10R for the rear wheel 94, the suspension mechanism 7 is located on the rear side of the vehicle with respect to the tire central axis Zt.

The suspension mechanism 7 is inclined such that the upper end is adjacent to the tire central axis Zt and the lower end is away from the tire central axis Zt. For this reason, the suspension mechanisms 7 of the front wheel 92 and the rear wheel 94 are arranged such that the interval between the suspension mechanisms 7 increases from the top to the bottom.

In contrast to a general vehicle having a pair of left and right wheels connected by a rack bar, a space for the rack bar is not required in a vehicle in which wheels can be steered independently. Thus, a space for the cabin is increased. In addition, since it is possible to perform "rotation on the spot" or "lateral movement" which is not possible in a general vehicle, the degree of freedom of movement such as entering a narrow road, turning, or parking in a narrow space is improved.

In the independently steered vehicle, each of the independently steered wheels is configured as a wheel module including a steering mechanism and a driving mechanism such as an in-wheel motor, and a braking mechanism such as an electric brake. Depending on the configuration of the wheel module, the effective space for the cabin may be narrowed, or the unsprung weight may be increased to cause deterioration in comfortableness for occupants.

In the present embodiment, a wheel module is provided mainly to improve ride comfort and is also advantageous in enlarging the cabin space and improving disturbance resistance. As described above with reference to FIG. 2, the wheel modules applied to the independently steered wheels have the same basic configuration except that the wheel module 10F for the front wheel and the wheel module 10R for the rear wheel have symmetrical shapes with respect to the tire central axis Zt. Hereinafter, the wheel module for the front wheel and the wheel module for the rear wheel will be described as the "wheel module 10" without distinguishing between them.

Figure 4:
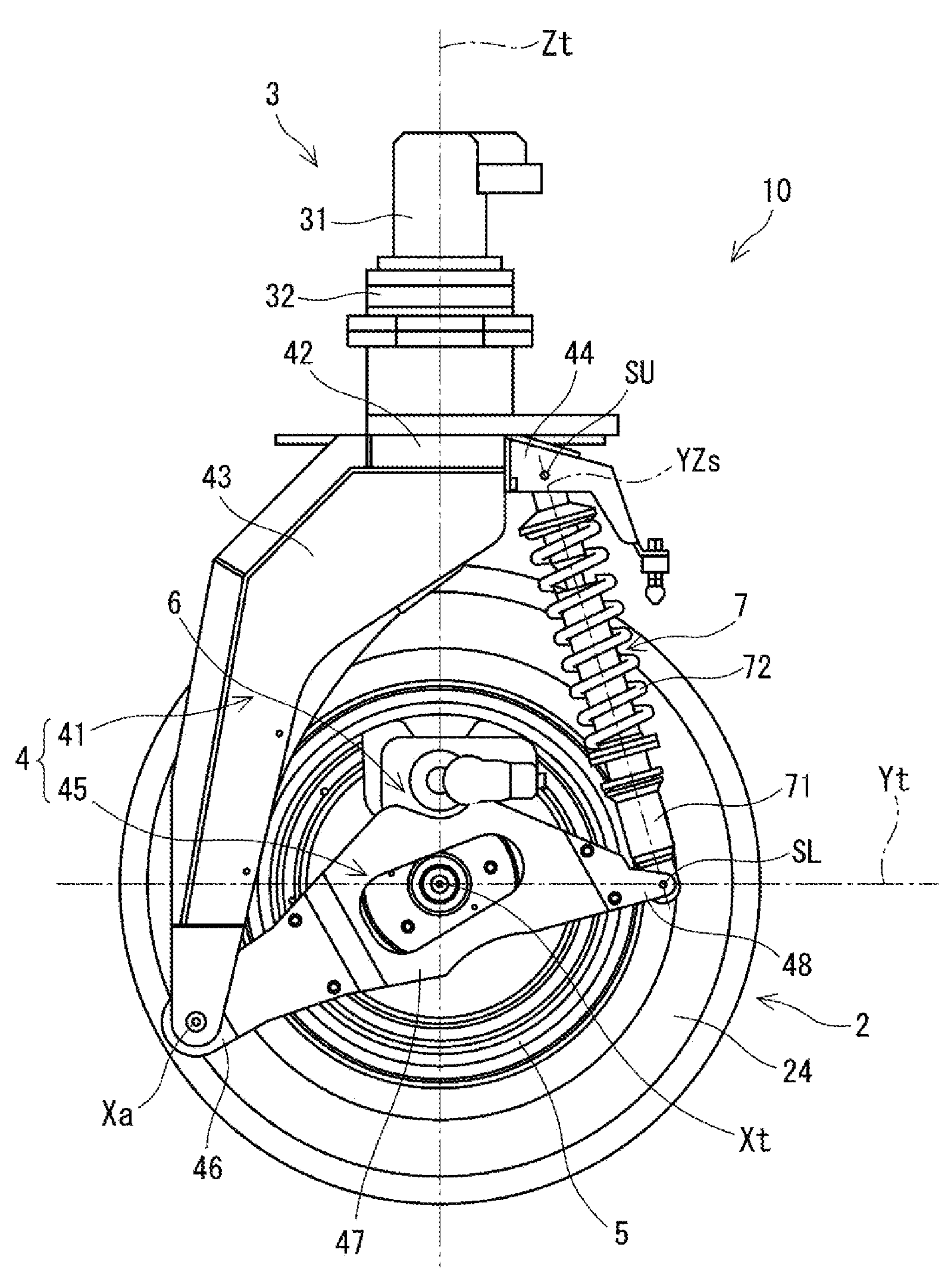
FIG. 4 is a side view in IV direction of FIG. 3 from an inner side of a tire.

FIGS. 3 to 6 show the configuration of the wheel module 10 according to the embodiment. Hereinafter, a surface of the tire 2 having a sidewall 24 is defined as a side surface, and a tread surface 25 facing frontward of the vehicle is defined as a front surface. For example, FIG. 4 is a view showing the wheel module 10 of the left front wheel 91 in FIG. 1 as viewed from the inner side.

A three-dimensional axis of the tire 2 is defined as follows. An X direction, a Y direction, and a Z direction correspond to the left-right direction, the front-rear direction, and the height direction of the vehicle traveling straight, respectively. An imaginary straight line passing through the center of the tire 2 in the radial direction is defined as a wheel axis Xt. An imaginary straight line passing through the center of the tire 2 in the radial direction and extending in the horizontal direction and the front-rear direction is defined as a front-rear axis Yt. An imaginary straight line extending in the vertical direction and passing through the center of the tire 2 in the radial direction and in the width direction of the tire 2 is defined as a tire central axis Zt.

The wheel module 10 includes the tire 2, a steering unit 3, an arm 4, a driving unit 5, a braking unit 6, and a suspension mechanism 7.

The steering unit 3 outputs a steering force for steering the tire 2 in accordance with a steering operation or the like by the driver. The steering unit 3 includes a steering motor 31 that outputs torque and a speed reducer 32 that reduces the speed of rotation of the steering motor 31 and transmits the rotation to the arm 4. The steering motor 31 and the speed reducer 32 are stacked on the tire central axis Zt. By increasing the reduction ratio of the speed reducer 32, the steering unit 3 is made compact.

Figure 7:
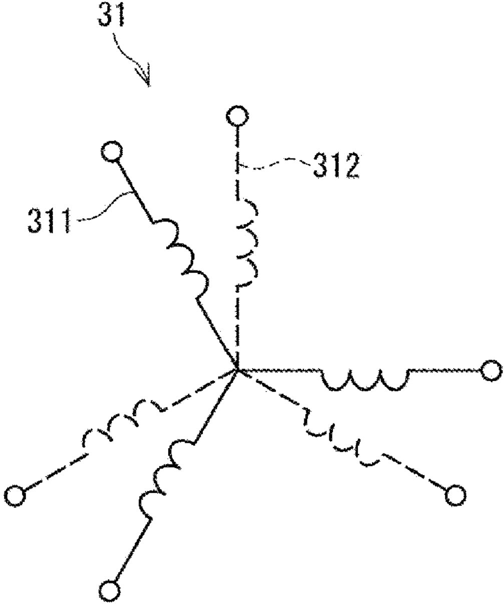
FIG. 7 is a diagram illustrating a multiple winding motor in a steering motor.

For example, as shown in FIG. 7, the steering motor 31 of the embodiment is configured by a double winding motor having two sets of three-phase winding sets 311 and 312 in a redundant manner. Accordingly, even when an abnormality occurs in one winding set or a corresponding drive circuit, the other winding set can be energized, and thus reliability is improved.

The arm 4 connects the steering unit 3 and the tire 2. The steering force output by the steering unit 3 is transmitted to the tire 2 via the arm 4. The arm 4 includes an upper arm 41 adjacent to the steering unit 3 and a rocker arm 45 adjacent to the tire 2.

The upper arm 41 includes a top plate portion 42, a main body portion 43, and a top plate extension portion 44. The top plate portion 42 is provided immediately above the tire 2 in the tire central axis Zt and is connected to the steering unit 3. The main body portion 43 extends from the upper side of the tire 2 to a position below the front-rear axis Yt, on one side of the tire central axis Zt (the left side in FIG. 4). The top plate extension portion 44 extends from the top plate portion 42 away from the main body portion 43 and supports the upper end fulcrum SU of the suspension mechanism 7. The upper arm 41 and the rocker arm 45 are coupled to each other so as to be rotatable about an arm coupling axis (shaft) Xa extending in the horizontal direction. As shown in FIG. 4, when viewed from the side surface of the tire 2, the arm coupling axis Xa is separated from the tire central axis Zt.

The rocker arm 45 includes a connecting end portion 46 provided around the arm coupling axis Xa, a central portion 47 provided around the wheel axis Xt, and a free end portion 48 provided opposite to the connecting end portion 46 with respect to the central portion 47. The free end portion 48 supports the lower end fulcrum SL of the suspension mechanism 7.

The driving unit 5 includes an in-wheel motor, and outputs a driving force for driving the tire 2 in accordance with an accelerator operation or the like by the driver. The braking unit 6 includes an electric or hydraulic brake, and outputs a braking force for braking the tire 2 according to a brake operation or the like by the driver.

The suspension mechanism 7 is supported at the upper end fulcrum SU and the lower end fulcrum SL, and reduces vibration or impact transmitted from the road surface. The suspension mechanism 7 includes a damper 71, which is a rod-shaped buffer member, and a coil-shaped spring 72 in which the damper 71 is inserted. A central axis of the damper 71 and the spring 72 is defined as a suspension mechanism axis YZs. The symbol "YZs" means an axis parallel to the YZ plane including the front-rear axis Yt of the tire 2 and the tire central axis Zt.

As shown in FIG. 4, about 70% length of the suspension mechanism 7 in the axial direction is positioned inside the tire 2 in the radial direction. For example, in a comparison example, a suspension mechanism is provided outside of the outer edge of the tire in the radial direction. In this case, the shaft length is increased and the cabin space is reduced. In contrast, in the present embodiment, since most length of the suspension mechanism 7 in the axial direction is located inside of the outer edge of the tire 2 in the radial direction, it is possible to enlarge the cabin space.

As shown in FIG. 4, when viewed from a side surface of the tire 2, the lower end fulcrum SL of the suspension mechanism 7 is positioned away from the tire central axis Zt. The suspension mechanism axis YZs is inclined with respect to the tire central axis Zt.

For example, in a comparison example, a spring of a shock absorber is vertically disposed along the center axis of the tire in the vertical direction. In this case, the impact from the road surface is directly transmitted to the spring, and the ride comfort is deteriorated. In contrast, in the present embodiment, since the suspension mechanism 7 is inclined, away from the tire central axis Zt, the impact from the road surface is less likely to be directly transmitted to the spring 72. Therefore, it is possible to suppress occurrence of unpleasant vibration when receiving disturbance in the vertical direction due to a step on the road surface, a stone, or the like, and to improve ride comfort.

The upper end fulcrum SU of the suspension mechanism 7 is rotatably supported by the top plate extension portion 44 of the upper arm 41. The lower end fulcrum SL is rotatably supported by the free end portion 48 of the rocker arm 45. The lower end fulcrum SL of the suspension mechanism 7 is rotatable about the arm coupling axis Xa in a plane parallel to the side surface of the tire 2. In the initial state shown in FIG. 4, the wheel axis Xt and the lower end fulcrum SL are disposed at the same height and at a position higher than the arm coupling axis Xa.

Figure 8:
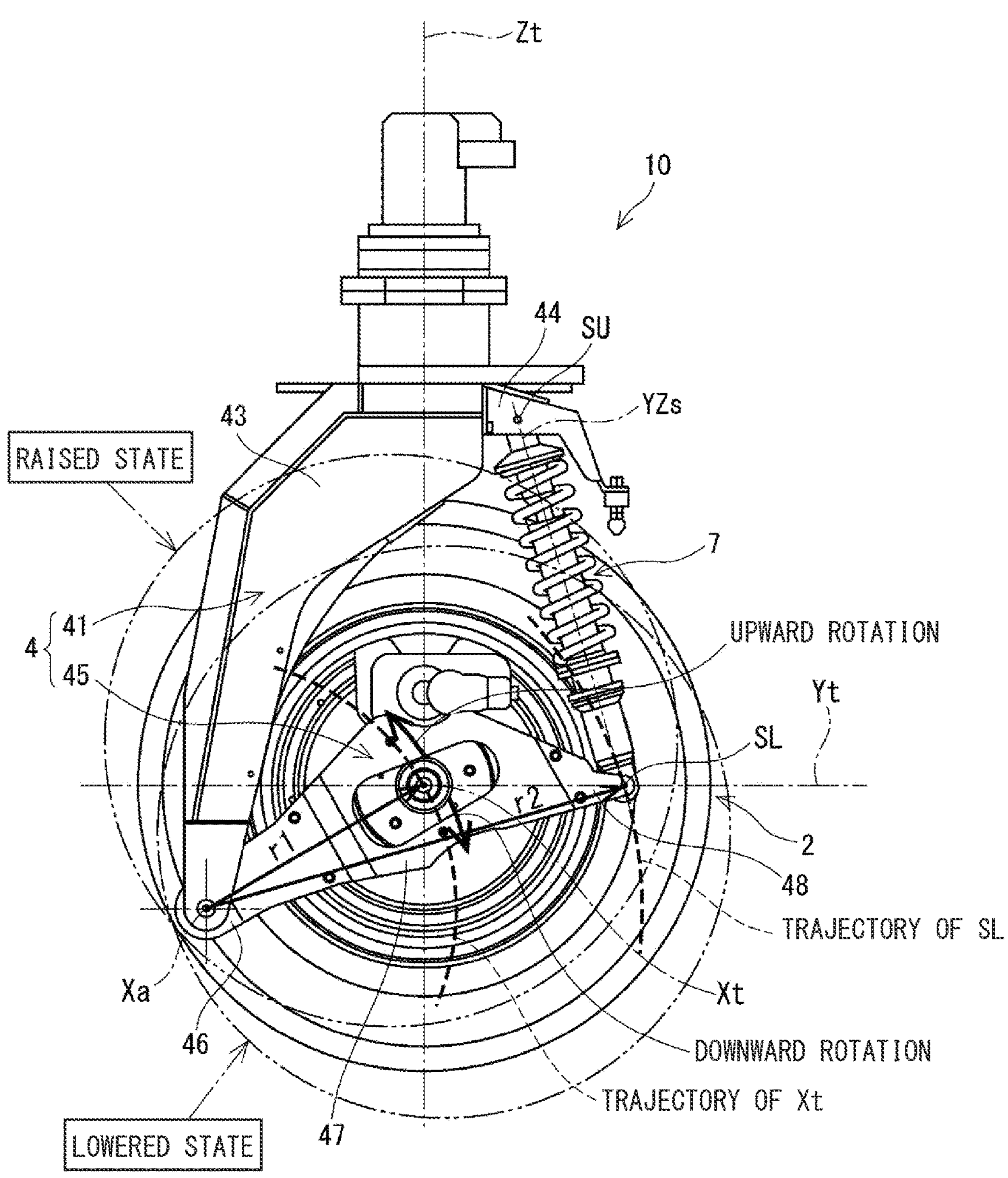
FIG. 8 is a diagram illustrating a rotation operation about an arm coupling axis.

Details of the rotation operation about the arm coupling axis Xa will be described with reference to FIGS. 8 to 10. FIG. 8 shows a raised state in which the tire 2 is rotated upward about the arm coupling axis Xa and a lowered state in which the tire 2 is rotated downward from the initial state shown by the solid line. In FIG. 8, for the sake of explanation, the rotation amount is shown larger than the actual rotation amount. At this time, the wheel axis Xt moves along a trajectory of an arc having a radius r1. When the tire 2 is in the raised state, the vehicle body is moved downward. When the tire 2 is in the lowered state, the vehicle body is moved upward. Accordingly, the lower end fulcrum SL of the suspension mechanism 7 moves along a trajectory of an arc having a radius r2.

Figure 9:
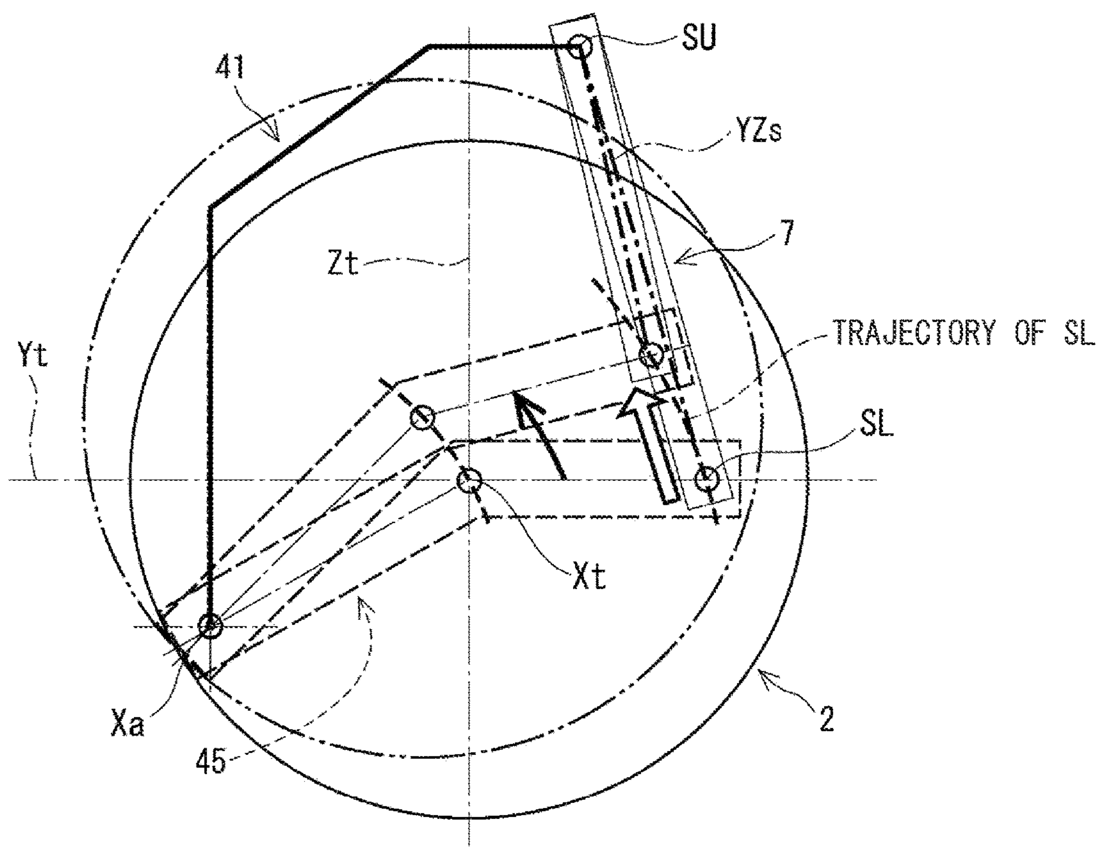
FIG. 9 is a schematic view illustrating a compression operation of a suspension mechanism during upward rotation.
Figure 10:
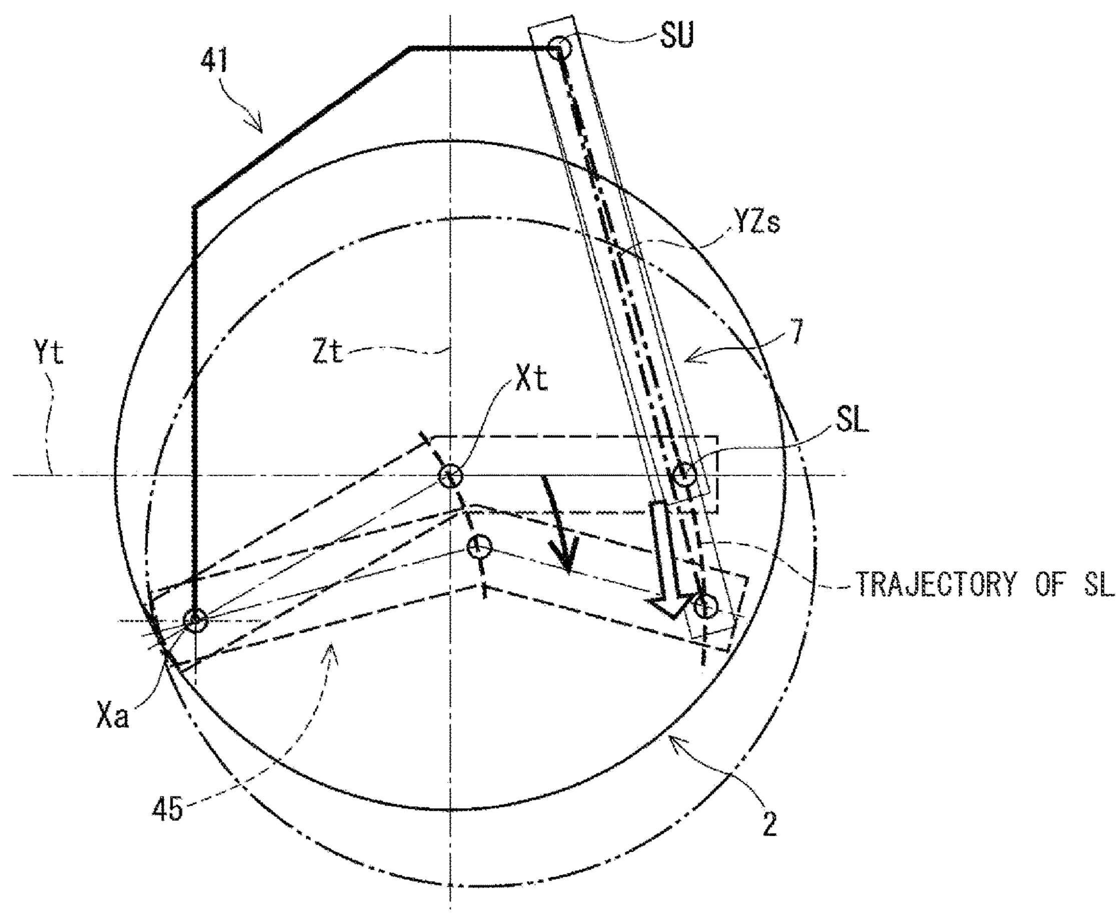
FIG. 10 is a schematic view illustrating an extension operation of the suspension mechanism during downward rotation.

FIGS. 9 and 10 schematically show the positional relationship among the tire 2, the upper arm 41, the rocker arm 45, and the suspension mechanism 7. The positions of the upper arm 41 and the upper end fulcrum SU of the suspension mechanism 7 do not change. As shown in FIG. 9, when the tire 2 receives an upward force from the road surface and the wheel axis Xt rotates upward, the position of the lower end fulcrum SL becomes high, and the spring 72 of the suspension mechanism 7 is compressed. As shown in FIG. 10, when the tire 2 receives a downward force from the road surface and the wheel axis Xt rotates downward, the position of the lower end fulcrum SL is lowered and the spring 72 of the suspension mechanism 7 is extended.

As described above, in the suspension mechanism 7, the lower end fulcrum SL supported by the rocker arm 45 rotates around the arm coupling axis Xa in accordance with the force received by the tire 2 from the road surface, thereby reducing vibration or impact transmitted from the road surface. Since the lower end fulcrum SL of the suspension mechanism 7 is disposed at a position away from the tire central axis Zt, the force directly transmitted from the road surface is attenuated and transmitted to the suspension mechanism 7 by the ratio of the rotation radius r1 of the wheel axis Xt and the rotation radius r2 of the lower end fulcrum SL. Therefore, as described above, it is possible to suppress the occurrence of unpleasant vibration when receiving disturbance from the road surface, and improve the ride comfort.

Figure 5:
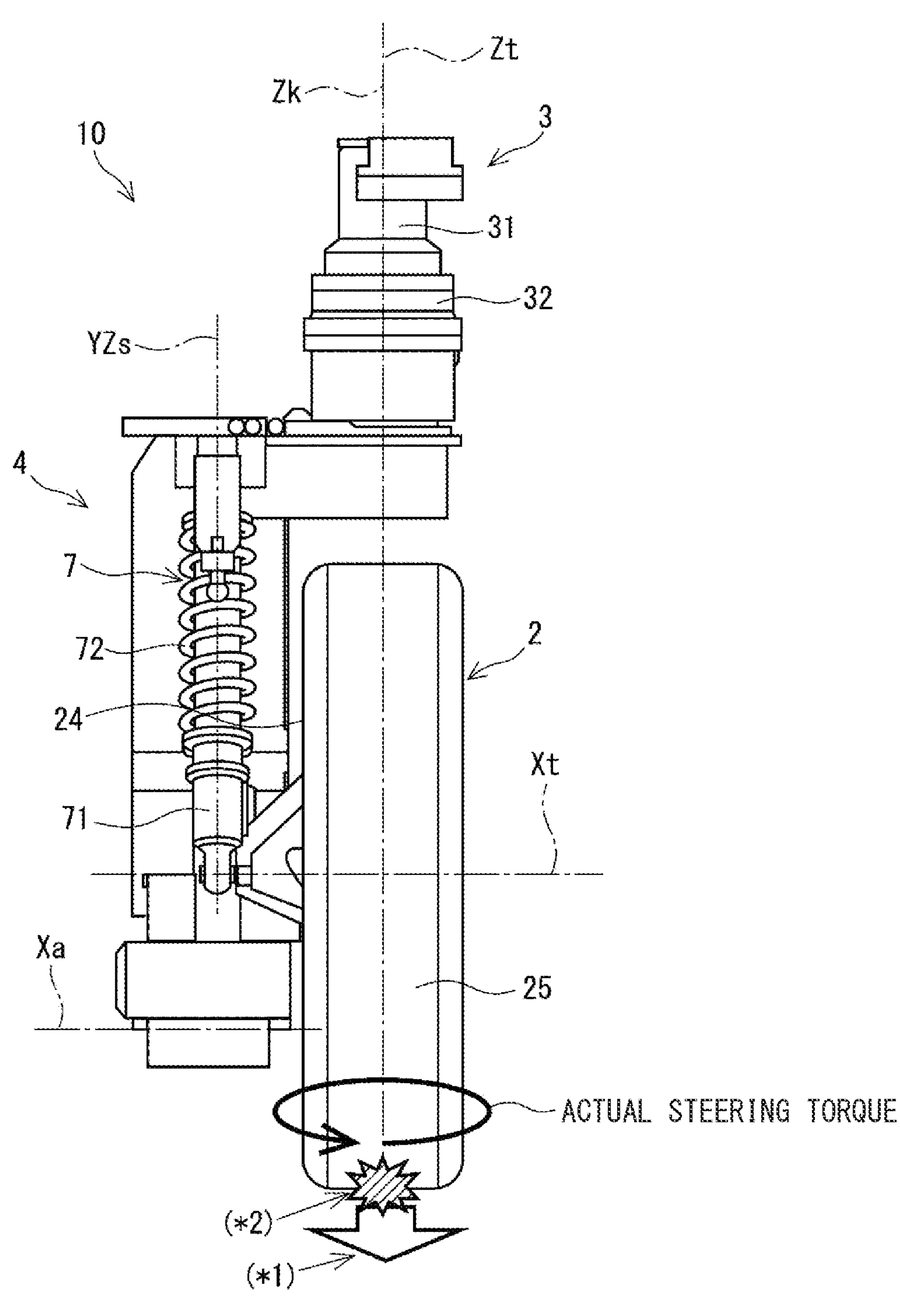
FIG. 5 is a front view in V direction of FIG. 3 from a front side of a tire.
Figure 6:
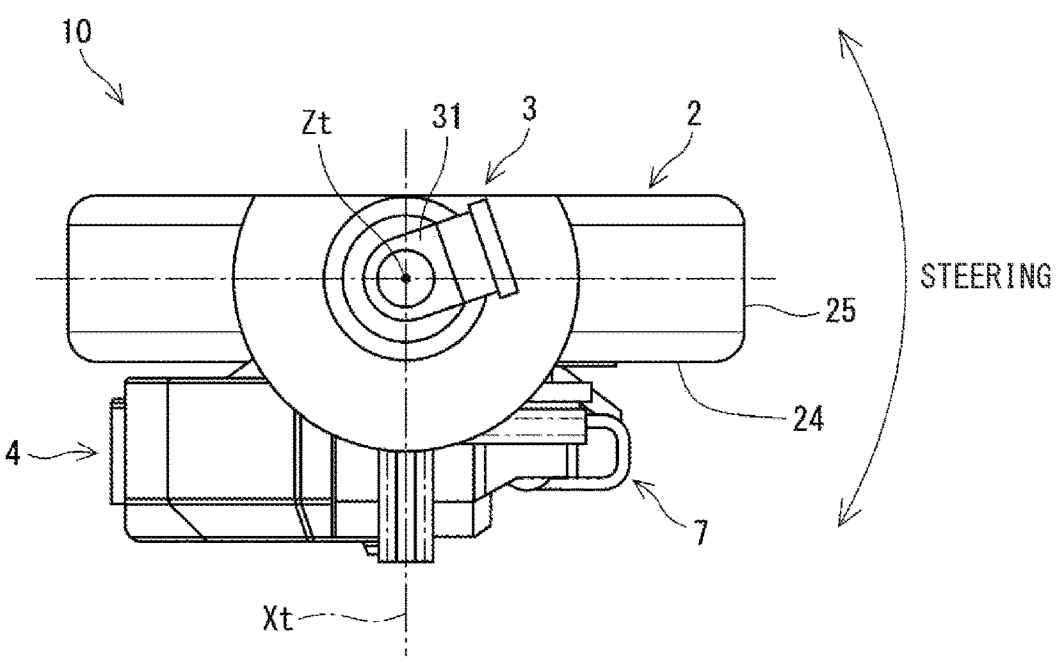
FIG. 6 is a plan view in VI direction of FIG. 3.

Next, regarding the steering operation, as shown in FIG. 5, when viewed from the front surface of the tire 2, the kingpin axis Zk and the tire central axis Zt coincide with each other. As shown in FIG. 6, when the tire 2 is steered, the positional relationship between the tire 2 and the suspension mechanism 7 is maintained.

In a comparison example, a kingpin axis, which is a steering center of the tire, is offset from the center axis of the tire in the width direction. In this case, the operation of "running/turning/stopping" may interfere due to disturbance such as an obstacle or a step, torque steering at the time of braking or driving, and the like.

In contrast, in the present embodiment, the king pin axis Zk and the tire central axis Zt are caused to coincide with each other, and the offset is set to zero, so that the torque steer becomes zero. That is, as indicated by the arrow (*1) in FIG. 5, since the influence of the braking/driving force on the actual turning torque is eliminated, it is possible to prevent the interference in the operation of "running/turning/stopping". In addition, as indicated by the impact mark (*2) in FIG. 5, there is no influence on the actual turning torque due to disturbance such as a step or a stone. Therefore, the disturbance resistance is improved.

OTHER EMBODIMENTS (a) The independently steered vehicle including the wheel module 10 is not limited to a four-wheeled vehicle, and may be a two-wheel vehicle or a three-wheel vehicle. Also in the two-wheel vehicle and the three-wheel vehicle, it is preferable that the suspension mechanism 7 is provided on the front side with respect to the tire central axis Zt in the wheel module 10F for the front wheel, and the suspension mechanism 7 is provided on the rear side with respect to the tire central axis Zt in the wheel module 10R for the rear wheel. In the case of a four-wheel vehicle, all wheels are not necessarily independently steered wheels. For example, the left and right front wheels may be independently steered wheels, and the left and right rear wheels may be connected by a rack bar. As described above, the wheel module 10 is used for a vehicle including at least two independently steered wheels as a target vehicle.

(b) The specific configurations of the steering unit 3, the driving unit 5, and the braking unit 6 are not limited to those in the embodiment, and may be any configurations while the respective functions are realized. The steering motor 31 is not limited to the double winding motor, and may be configured by a multiple winding motor having three or more sets of windings in a redundant manner. Alternatively, a motor composed of a set of windings may be used.

(c) The arm 4 is not limited to have the upper arm 41 and the rocker arm 45 coupled to each other, and may integrally connect the steering unit 3 and the tire 2.

(d) The wheel module 10 may be applied to an autonomous driving vehicle. In this case, "in accordance with the operation by the driver" in the description of the steering unit 3, the driving unit 5, and the braking unit 6 in the embodiment may be read as "in accordance with the command of the automated driving".

The present disclosure should not be limited to the embodiment. Various other embodiments may be implemented without departing from the scope of the present disclosure.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A wheel module for a vehicle including at least two independently steered wheels to be steered independently, the wheel module comprising:

a tire having a side wall defined as a side surface and a tread face defined as a front surface facing frontward of the vehicle;

a steering unit configured to output a steering force for the tire;

an arm connecting the steering unit and the tire, wherein a steering force output by the steering unit is transmitted to the tire via the arm;

a driving unit configured to output a driving force for the tire;

a braking unit configured to output a braking force for the tire; and a suspension mechanism supported by an upper end fulcrum and a lower end fulcrum so as to reduce vibration or impact transmitted from a road surface, wherein the suspension mechanism includes a rod-shaped damper and a coil-shaped spring in which the rod-shaped damper is inserted, an imaginary straight line extending along a vertical direction and passing through a center of the tire in a radial direction and in a width direction of the tire is defined as a tire central axis, the lower end fulcrum of the suspension mechanism is positioned away from the tire central axis when viewed from a side surface of the tire, the arm has an upper arm adjacent to the steering unit and a rocker arm adjacent to the tire, the upper arm and the rocker arm are connected to each other so as to be rotatable about an arm coupling axis extending in a horizontal direction, the arm coupling axis is separated from the tire central axis and located opposite to the lower end fulcrum of the suspension mechanism with respect to the tire central axis when viewed from a side surface of the tire, and is located lower than the center of the tire in the radial direction, the upper end fulcrum of the suspension mechanism is rotatably supported by the upper arm, and the lower end fulcrum is rotatably supported by the rocker arm, and the lower end fulcrum of the suspension mechanism is rotatable about the arm coupling axis in a plane parallel to a side surface of the tire.

2. The wheel module according to claim 1, wherein the suspension mechanism is inclined with respect to the tire central axis when viewed from a side surface of the tire.

3. The wheel module according to claim 1, wherein a positional relationship between the tire and the suspension mechanism is maintained when the tire is steered.

4. The wheel module according to claim 1, wherein a kingpin axis and the tire central axis coincide with each other when viewed from a front surface of the tire.

5. The wheel module according to claim 1, wherein the steering unit includes a steering motor that outputs torque, and a speed reducer that reduces rotation of the steering motor and transmits the rotation to the arm.

6. The wheel module according to claim 5, wherein the steering motor includes a multi-winding motor having a plurality of winding sets in a redundant manner.

7. The wheel module according to claim 1, which is an independently steered wheel for a vehicle having at least one front wheel and at least one rear wheel, wherein the suspension mechanism in the wheel module for a front wheel is provided on a front side of the vehicle with respect to the tire central axis, and the suspension mechanism in the wheel module for a rear wheel is provided on a rear side of the vehicle with respect to the tire central axis.

8. The wheel module according to claim 1, wherein the suspension mechanism is inclined such that an upper end of the suspension mechanism is closer to the tire central axis than a lower end of the suspension mechanism.

9. The wheel module according to claim 1, wherein in an initial state, the lower end fulcrum is positioned higher than the arm coupling axis.

10. The wheel module according to claim 1, wherein in an initial state, a wheel axis of the tire and the lower end fulcrum are disposed at a same height.

* * * * *